US012609291B2

(12) United States Patent
Kim et al.

(10) Patent No.: US 12,609,291 B2
(45) Date of Patent: Apr. 21, 2026

(54) METHOD FOR MANUFACTURING ELECTRODE PLATE FOR SECONDARY BATTERY, AND ELECTRODE PLATE FOR SECONDARY BATTERY

(71) Applicant: LG Energy Solution, Ltd., Seoul (KR)

(72) Inventors: Sun Kyu Kim, Daejeon (KR); Sang Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 883 days.

(21) Appl. No.: 17/909,094

(22) PCT Filed: Sep. 17, 2021

(86) PCT No.: PCT/KR2021/012867
§ 371 (c)(1),
(2) Date: Sep. 2, 2022

(87) PCT Pub. No.: WO2022/092577
PCT Pub. Date: May 5, 2022

(65) Prior Publication Data
US 2023/0378418 A1     Nov. 23, 2023

(30) Foreign Application Priority Data
Oct. 26, 2020    (KR) ........................ 10-2020-0139040

(51) Int. Cl.
*H01M 4/04*          (2006.01)
*H01M 4/139*         (2010.01)
(52) U.S. Cl.
CPC ......... *H01M 4/0404* (2013.01); *H01M 4/139* (2013.01)

(58) Field of Classification Search
CPC ....... H01M 4/04; H01M 4/0404; H01M 4/139
See application file for complete search history.

(56) References Cited

U.S. PATENT DOCUMENTS 6,152,971 A      11/2000  Miyanowaki et al.
2015/0217550 A1   8/2015  Gosnell et al.
(Continued)

FOREIGN PATENT DOCUMENTS

CN        104837644 A    8/2015
CN        108352509 A    7/2018
(Continued)

OTHER PUBLICATIONS

KR 20170105752 English translation. Kim et al. Korea. Sep. 20, 2017. (Year: 2017).*

(Continued)

*Primary Examiner* — Christopher P Domone
(74) *Attorney, Agent, or Firm* — Lerner David LLP

(57)                ABSTRACT
A method for manufacturing an electrode plate for a secondary battery, by performing a pattern-coating to have a coated part, on which an electrode slurry has been coated, and a non-coated part, on which the electrode slurry has not been coated, on an electrode current collector sheet, including: attaching at least one adhesive film on at least one portion of the non-coated part on the electrode current collector sheet; consecutively coating an electrode slurry on the electrode current collector sheet including the adhesive-film-attached portion; heating and drying the electrode slurry; and peeling the adhesive film from the electrode current collector sheet and retrieving the adhesive film.

11 Claims, 6 Drawing Sheets

(56) References Cited

U.S. PATENT DOCUMENTS

| | | | |
|---|---|---|---|
| 2015/0236337 A1 | 8/2015 | Kim et al. | |
| 2016/0297676 A1 | 10/2016 | Pahl | |
| 2018/0315991 A1 | 11/2018 | Kim et al. | |
| 2020/0266418 A1* | 8/2020 | Yao | H01M 4/0435 |
| 2020/0403211 A1 | 12/2020 | Kim | |
| 2021/0119200 A1 | 4/2021 | Nam | |
| 2022/0310985 A1 | 9/2022 | Park et al. | |

FOREIGN PATENT DOCUMENTS

| | | |
|---|---|---|
| CN | 110431694 A | 11/2019 |
| CN | 111712946 A | 9/2020 |
| JP | 2000208134 A | 7/2000 |
| JP | 2016523725 A | 8/2016 |
| JP | 2018063861 A | 4/2018 |
| KR | 19990028142 A | 4/1999 |
| KR | 20140034405 A | 3/2014 |
| KR | 20150044915 A | 4/2015 |
| KR | 20150049516 A | 5/2015 |
| KR | 20170105752 A | 9/2017 |
| KR | 20180008036 A | 1/2018 |
| KR | 20190119822 A | 10/2019 |
| KR | 20190143303 A | 12/2019 |
| KR | 20200119728 A | 10/2020 |
| WO | 2020209540 A1 | 10/2020 |

OTHER PUBLICATIONS

JP2018063861 English translation. Momose et al. Japan. Apr. 19, 2018. (Year: 2018).*

Xu Dong , Qian Guo-qiang, "Effect of cathode ratio of carbon coated aluminum foil material on cycle performance of lithium ion batteries", Wuxi Institute of Commerce and Zhong Tai Automobile Engineering Research Institute, Apr. 2018, vol. 42, No. 4. 4 pages.

Cheng Tao, et al., "Light weight and highly stable graphite paper as anode current collectors for lithium ion batteries", Journal of University of Science and Technology of China, vol. 47, No. 12: 971-977, Dec. 2017. 8 pages.

Search Report dated Mar. 14, 25 from Office Action for Chinese Application No. 202180019964.9 issued Mar. 20, 2025. 3 pages (see p. 1-3, categorizing the cited references).

International Search Report for PCT/KR2021/012867 mailed Jan. 10, 2022. 3 pgs.

Extended European Search Report including Written Opinion for Application No. 21886571.5 dated Jul. 30, 24, pp. 1-9.

* cited by examiner

【FIG. 1】
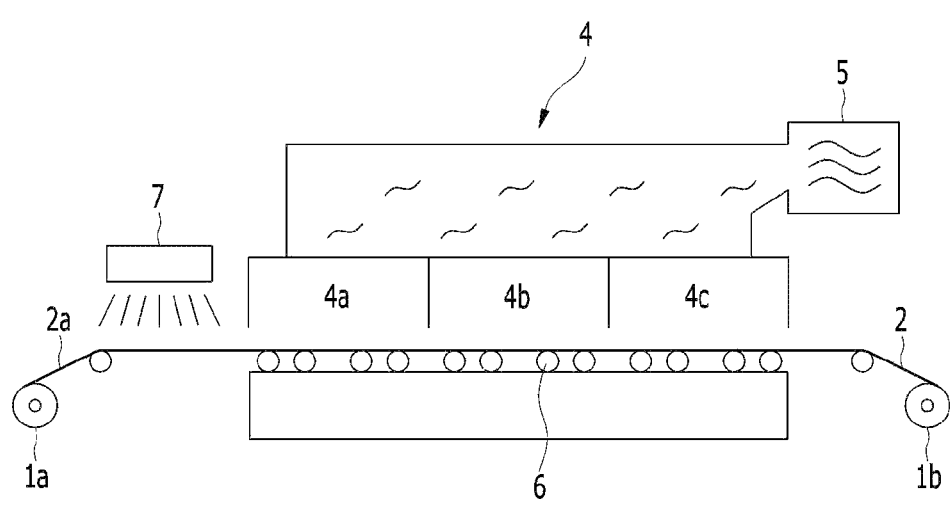

【FIG. 2】
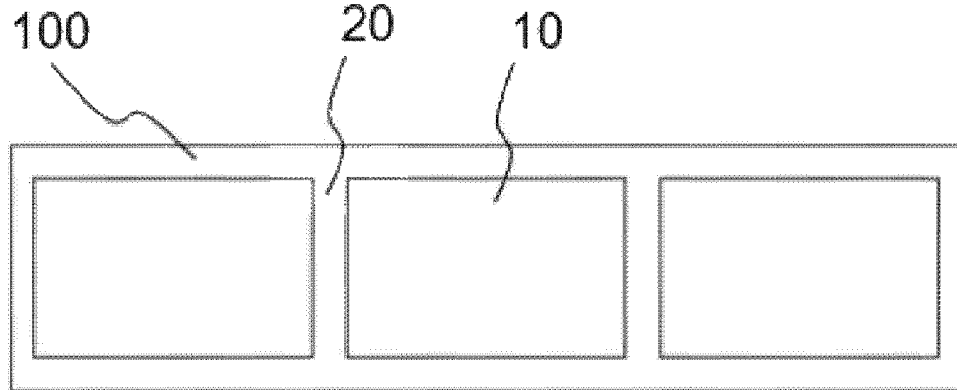

【FIG. 3】
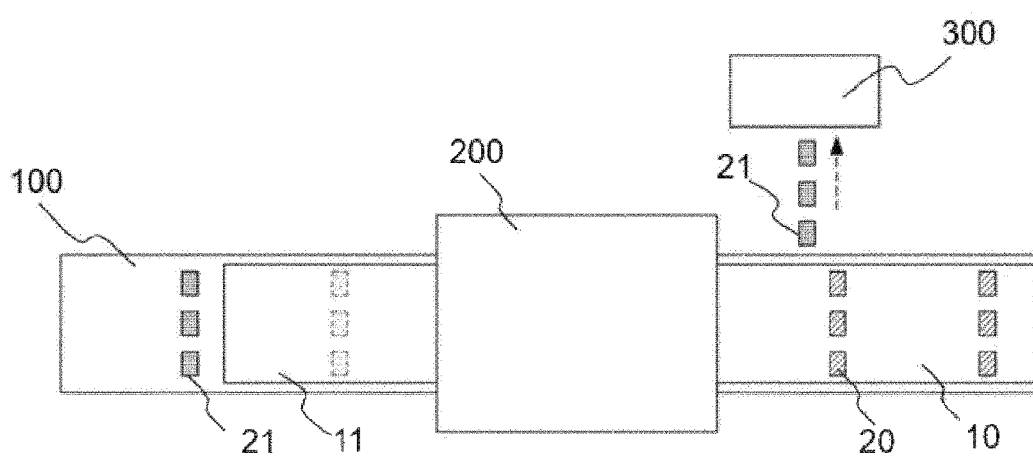

【FIG. 4】
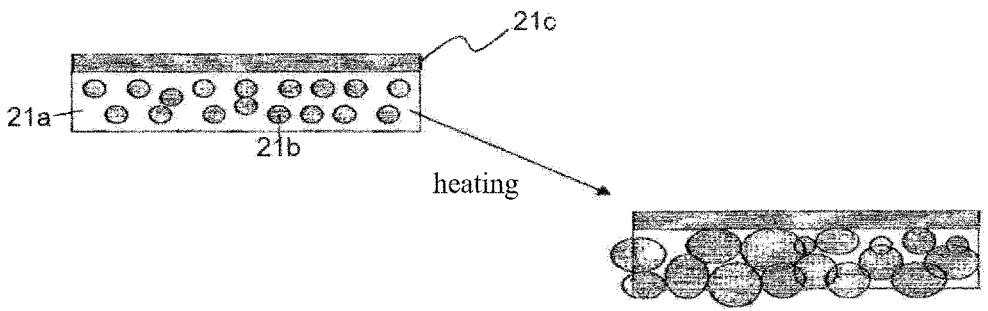

【FIG. 5】
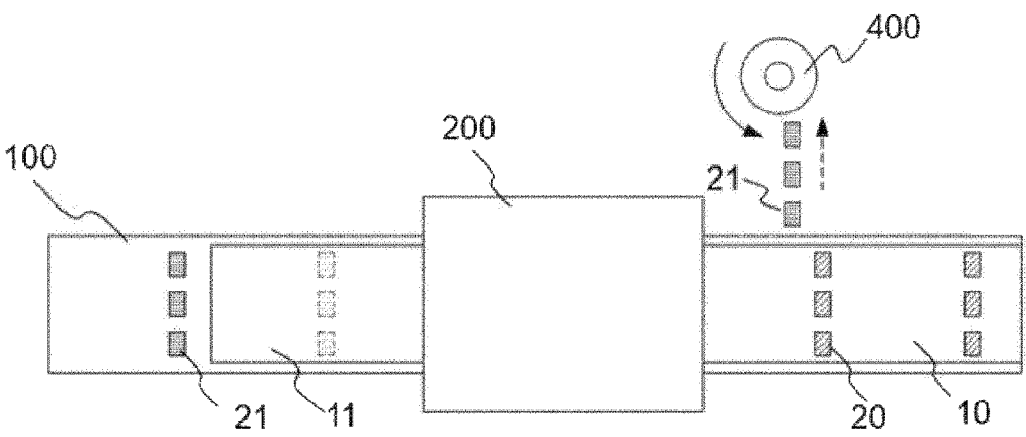

【FIG. 6】
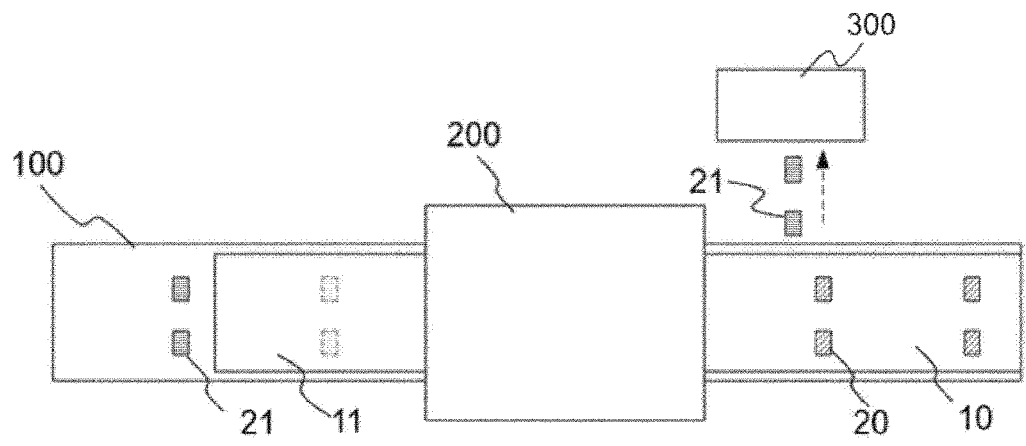

METHOD FOR MANUFACTURING ELECTRODE PLATE FOR SECONDARY BATTERY, AND ELECTRODE PLATE FOR SECONDARY BATTERY

CROSS REFERENCE TO RELATED APPLICATIONS

The present application is a national phase entry under 35 U.S.C. § 371 of International Application No. PCT/KR2021/012867, filed on Sep. 17, 2021, which claims priority to Korean Patent Application No. 10-2020-0139040, filed on Oct. 26, 2020, the disclosures of which are incorporated herein by reference.

TECHNICAL FIELD

The present disclosure relates to a method for manufacturing an electrode plate for a secondary battery.

The present disclosure also relates to an electrode plate for a secondary battery, which is manufactured by the method for manufacturing the electrode plate.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

An electrode assembly for charging and discharging electric energy in a case is built in the lithium secondary battery. Electrodes (positive electrode and negative electrode) constituting the electrode assembly generate electric current through ion exchange, and each of the positive electrode and the negative electrode is manufactured as an electrode substrate, which is obtained by applying an electrode slurry on the surface of a current collector made of an aluminum or copper film and drying the electrode slurry, is tab-processed and is cut in an appropriate size. The electrode slurry is applied on the surface of the current collector in a form in which a solvent is mixed with an active material, and is manufactured as an electrode substrate. The electrode substrate is dried to allow the electrode active material to be hardened on the surface of the current collector by evaporating the solvent of the electrode slurry.

FIG. 1 is a schematic diagram of a heat drying device for drying an electrode substrate.

As illustrated in FIG. 1, during the process that the current collector sheet 2a is unwound from an unwinding roller 1a and is then wound on a winding roller 1b, an electrode substrate 2, which is obtained as an electrode slurry has been applied on the surface of the current collector sheet 2a through a coater 7, is made to pass through an electrode oven 4 by a roller 6 to be heat-dried, which is then wound on the winding roller 1b. The electrode oven 4 has one or more drying chambers 4a, 4b and 4c, and the temperature of each drying chamber is controlled by heat generated in a heater 5.

FIG. 2 illustrates a sequential pattern of an electrode current collector sheet.

The portion where the electrode slurry has been coated (coated part 10) and the portion where the electrode slurry has not been coated (non-coated part 20) are alternatively arranged on the electrode current collector sheet 100.

The non-coated part 20 is formed because the surface of the exposed current collector sheet (metal) is necessary to form a terminal for connecting a positive electrode to a negative electrode at the time of later forming an electrode assembly. A tab may be formed on the non-coated part 20 through a later notch process, etc.

In a conventional art, in order to form such an electrode pattern, an intermittent or discontinuous coating job, in which the start and stop of the electrode slurry discharge are repeated while moving the coater or the current collector according to the pattern of the coated part 10 or the non-coated part 20, was performed. When the coating speed is relatively slow, the pattern can be accurately formed to some extent by such a discontinuous coating job, but the productivity may decrease because the working speed is significantly slow.

Further, when the coating speed increases, it is difficult to syntonize the mechanical control of the coater head to the coating speed, thereby making it difficult to form a pattern where the non-coated part and the coated part are alternately repeated.

Further, in the conventional electrode plate, non-coated parts 20 formed between the coated parts 10 are formed in the width direction of the electrode plate as shown in FIG. 2. Since the electrode slurry is not applied on the non-coated part 20, it does not contribute to the increase in battery capacity or energy density.

Therefore, there is a need for a technology for improving the battery capacity, etc. while improving the coating speed of the electrode pattern.

PRIOR ART LITERATURE

Patent Document

Korea Patent Publication No. 10-2015-0049516

DISCLOSURE

Technical Problem

The present technology is believed to solve at least some of the above problems. For example, an aspect of the present invention provides a method for manufacturing an electrode plate for a secondary battery, which can improve the coating speed by consecutively coating an electrode slurry on an electrode current collector sheet.

Further, another aspect of the present invention provides a method for manufacturing an electrode plate for a secondary battery, which can efficiently form an electrode pattern on an electrode by simply peeling off a non-coated part on an electrode current collector.

Further, another aspect of the present invention provides a method for manufacturing an electrode plate for a secondary battery, which can increase the battery capacity and energy density by enlarging the electrode-slurry-coated part.

Further, the present disclosure relates to an electrode plate for a secondary battery, which is manufactured by the above manufacturing method and can increase the battery capacity and energy density.

Technical Solution

A method for manufacturing an electrode plate for a secondary battery of the present technology for solving the above problems is a method for manufacturing an electrode plate by performing a pattern-coating to have a coated part, on which an electrode slurry has been coated, and a non-coated part, on which the electrode slurry has not been coated, on an electrode current collector sheet, including: attaching at least one adhesive films on at least one portion of the non-coated part on the electrode current collector sheet; consecutively coating an electrode slurry on the electrode current collector sheet including the adhesive-film-attached parts; heating and drying the electrode slurry; and peeling the adhesive film from the electrode current collector sheet and retrieving the adhesive film. Herein, an adhesive force of the adhesive film is reduced by the heating and drying of the electrode slurry, so that the adhesive film can be removed from the electrode current collector sheet during the peeling and retrieving, and as the adhesive film is removed, a surface of the electrode current collector sheet is exposed.

Specifically, the adhesive force of the adhesive film is reduced by heat during the heating and drying of the electrode slurry.

In one example, the adhesive film includes a filler which expands in volume by heat.

The filler may expand in a temperature of 80° C. or higher, and preferably in a temperature between 100 and 200° C.

The adhesive film may be peeled off from the surface of the electrode current collector sheet by adsorbing the adhesive film.

In an example of the present invention, the adhesive film may be peeled off by vacuum-adsorbing the adhesive film by using a vacuum adsorption device.

In another example of the present invention, the adhesive film may be peeled off by adsorbing the adhesive film onto an adhesive roller having an outer circumference on which an adhesive tape has been attached.

Preferably, the adhesive film may be peeled off by adsorbing the electrode current collector sheet while moving along an upper surface of the electrode current collector sheet.

The surface of the electrode current collector sheet may be pressed to be flat after removing the adhesive film.

Further, the pattern on the electrode current collector sheet may be adjusted by adjusting at least one of the number, the size and the shape of the adhesive film, and the location where the adhesive film is attached.

Further, in another aspect of the present invention, an electrode plate for a secondary battery may be provided by the above manufacturing method. In one example, the electrode plate comprising an electrode current collector sheet including at least one coated part, on which an electrode slurry has been coated, and at least one non-coated part, on which the electrode slurry has not been coated, on an electrode current collector sheet. Herein, the non-coated part is positioned along a longitudinal direction of the electrode current collector sheet at regular intervals, a plurality of non-coated parts are formed to be spaced apart from each other along a width direction of the electrode current collector sheet, and the coated part is formed on at least portion other than the non-coated part.

Advantageous Effects

According to the present technology, it is possible to significantly improve the coating speed of the electrode slurry by consecutively forming an electrode pattern.

Further, according to the present technology, it is possible to increase the battery capacity and energy density by enlarging the electrode-slurry-coated part by forming the non-coated part at only desired places on the electrode current collector.

Further, according to the present technology, the adhesive film for forming a non-coated part pattern on the electrode current collector can be consecutively peeled off while moving along the surface of the electrode current collector sheet, which is an advantage.

BRIEF DESCRIPTION OF THE DRAWINGS

FIG. 1 is a schematic diagram of a heat drying device for drying an electrode substrate.

FIG. 2 is a schematic diagram showing a discontinuous pattern forming method on a conventional electrode current collector sheet.

FIG. 3 is a schematic diagram showing a method for manufacturing an electrode plate according to an embodiment of the present invention.

FIG. 4 is a schematic diagram showing the structure of an adhesive film used in the present technology.

FIG. 5 is a schematic diagram showing a method for manufacturing an electrode plate according to another embodiment of the present invention.

FIG. 6 is a schematic diagram showing a method for manufacturing an electrode plate according to further another embodiment of the present invention.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

The present technology is devised to improve a conventional a discontinuous pattern coating technology (see FIG. 2) which forms a coated part, on which an electrode slurry discharged from a coater is applied in the process of moving the electrode current collector sheet, and forms a non-coated part without an electrode slurry by stopping the discharge of the electrode slurry.

A main feature of the present technology is in attaching an adhesive film on a portion where a non-coated part is to be formed in order to consecutively perform a discontinuous pattern coating.

Further, an electrode slurry is consecutively coated on the electrode current collector sheet including the adhesive-film-attached portion. Hence, an electrode slurry is applied on the upper portion of the adhesive film. What is important is whether it is possible to efficiently peel off and retrieve the adhesive film, on which an electrode slurry has been applied. When the peeling and retrieving process of the adhesive film becomes difficult, it is not possible to appropriately form a non-coated part. As such, the technical significance of the converting the discontinuous coating into a continuous coating significantly decreases. The present technology adopts a means which makes the peeling of the adhesive film easy by naturally reducing the adhesive force of the adhesive film through a heat-drying process of the electrode slurry. Namely, the adhesive force of the adhesive film is not reduced by a separate heating or cooling process after the heat-drying process of the electrode slurry, but the adhesive force of the adhesive film can be reduced by high temperature heat applied during the heat-drying process of the electrode slurry. Hence, according to the present technology, a series of process flows of the consecutive coating process-heat-drying process of FIG. 1 are not interfered. Accordingly, the method of the present technology is more suitable for automation of equipment and further improves the productivity.

The present technology uses a specific adhesive film that reduces adhesive force by heat by heat for this purpose.

First Embodiment

FIG. 3 is a schematic diagram showing a method for manufacturing an electrode plate according to first embodiment of the present invention.

In FIG. 3, the electrode current collector sheet 100 is moved from left to right, and the electrode current collector sheet 100 consecutively goes through a series of processes while moving from left to right.

First, an adhesive film 21 is attached on the portion where the non-coated part is to be formed in the electrode current collector sheet 110 according to the manufacturing method of the present embodiment. The attachment of the adhesive film 21 is carried out before the application of the electrode slurry, and there is no particular limitation on the attachment method. Preferably, the adhesive film 21 can be automatically positioned and attached by automatically positioning the adhesive film 21 at non-coated parts by a robot which stores information on the positions where non-coated parts are to be formed. Unlike conventional non-coated parts formed in a band shape between the coated parts 10, in the present technology, non-coated parts 20 are formed in specific positions in a spot shape at intervals. This is accomplished by using a specific adhesive film and peeling method of the present technology.

After attaching the adhesive film 21, the electrode slurry is consecutively applied on the electrode current collector sheet 100 including the portions where the adhesive film has been attached. A rectangle represented by the dotted line of FIG. 3 shows an adhesive film on which the electrode slurry has been applied. As such, an electrode slurry coating portion 11 is formed as the electrode slurry is consecutively applied by the designed width direction length on the electrode current collector sheet 110 except for the non-coating portion at two ends in the width direction of the sheet. Since the electrode slurry is consecutively applied regardless of whether the adhesive film 21 has been attached, the coater discharge does not need to be stopped as in the conventional art.

Thereafter, as the electrode current collector sheet 100 is heated in a drying device 200, the electrode slurry on the sheet is dried. In this heat-drying process, the adhesive force of the adhesive film 21 on the lower portion of the electrode slurry decreases. That is, in the present technology, the drying of the electrode slurry and the adhesive force reduction of the adhesive film 21 are performed simultaneously in the drying process in the drying device 200. Hence, since the adhesive force of the adhesive film on the electrode current collector sheet 100, which passed through the drying device 200, decreased, the adhesive film comes to be in an easily detachable state. The surface of the current collector sheet is exposed by peeling off the adhesive film, and this portion becomes the non-coated part 20.

The adhesive force of the adhesive film 21 of the present technology decreases while going through the heat-drying process. In the present embodiment, the adhesive force of the adhesive film decreases by heat during the heat-drying process.

<Adhesive Force Reduction Mechanism>

FIG. 4 is a schematic diagram showing the structure of an adhesive film 21 used in the present technology. FIG. 4 shows an example of an adhesive film 21 in which the adhesive force decreases by heat in the heat-drying process. As illustrated, the adhesive film 21 includes an adhesive 21a, a filler 21b, and a film sheet 21c on which an adhesive and a filler are attached. When heat is applied, the filler 21b expands. Then most of the adherend area with the surface of the electrode current collector sheet 100 is occupied by the filler 21b, which significantly reduces the adherend area of the sheet surface, and the adhesive film 21 comes to be in a removable state.

The adhesive 21a can be manufactured using a known adhesive composition in the range of not interfering with the action of the filler 21b. For example, acrylic adhesive, which is obtained by mixing a flexible acrylate monomer and a hard acrylate monomer in a predetermined rate, may be used. If necessary, a photoinitiator or a photocrosslinking agent can be added to the adhesive. A curable or thermoplastic product is preferably used as the filler 21b. For example, a Polymeric Sphere Expancel 551 DU (product name) of AkzoNobel may be used. The composition of the filler 21b and the adhesive 21a, the diameter of the filler 21b, etc. can be appropriately selected in consideration of the adhesive force reduction at the time of later filler expansion. Preferably, the diameter of the filler 21b is 6 to 24 microns.

One having a characteristic of expanding during the heat-drying process of the electrode slurry may be used as the filler 21b. Hence, the filler 21b expands at a temperature of 80° C. or higher. The filler 21b preferably expands in a general heat-drying temperature range of 100 to 200° C. The above-mentioned product filer 21b meets these conditions.

<Peeling Mechanism>

The adhesive film peeling and retrieving mechanism of the present technology will be described with reference to FIG. 3.

The electrode slurry at the upper portion of the electrode current collector sheet 100, which has passed through the drying device 200, is dried and is coated on the surface of the sheet. The electrode slurry on the upper portion of the region where the adhesive film 21 has been attached is also dried, and the adhesive force of the adhesive film 21 at the lower portion decreases to thereby come to be in a peelable state. However, since the electrode slurry on the upper portion of the adhesive film 21 is connected to the electrode slurry on the portion (coated part) without including the adhesive film 21, the adhesive film 21 should be removed using a predetermined peeling tool because it is not easily peeled off. The adhesive film can be retrieved by adsorbing the adhesive film 21 using a predetermined device.

Namely, as shown in FIG. 3, the adhesive film 21 can be peeled off by adsorbing the upper surface of the electrode current collector sheet 100 using a vacuum adsorption device 300. At this time, since the electrode slurry portion, on which the adhesive film 21 has not been attached, has been coated on the surface of the sheet, the adhesive force is much higher than that of the adhesive film 21, it cannot be peeled off by using the vacuum adsorption device 300. Hence, the adhesive film 21 can be retrieved by peeling off the adhesive film 21 using the vacuum adsorption device 300. When adhesive film 21 is retrieved, the surface of the current collector sheet 100 is exposed, and the exposed surface becomes the non-coated part 20. Hence, the pattern of the coated part, on which an electrode slurry has been coated, and the non-coated part without the electrode slurry is completed by the peeling and retrieving of the adhesive film.

In the present technology, the process of peeling off the adhesive film 21 can be consecutively performed. Namely, for example, the adhesive film 21 can be peeled off by adsorbing the front surface of the sheet while moving along the upper surface of the current collector sheet 100 without needing to peel off the adhesive film 21 by making a peeling device approach the portion where the adhesive film 21 has been attached. As described, since the electrode slurry of the coated part 10 has been firmly attached on the surface of the current collector sheet 100, the electrode slurry is not peeled off by adsorption by the vacuum adsorption device 300, and only the adhesive film 21 on the portion, where the non-coated part has been formed, can be easily peeled off by the decrease of the adhesive force. Hence, since the adhesive film 21 can be peeled off while moving along the entire upper surface of the current collector sheet 100 without needing to specifying the portions where the adhesive film 21 has been attached, the peeling efficiency and productivity can be significantly improved. Herein, since the current collector sheet 100 is moved from left to right along the manufacturing line, a consecutive peeling is possible even when an adsorption device is fixed. Alternatively, the adsorption device can be moved at an appropriate speed in the opposite direction in consideration of the transfer speed of the current collector sheet 100.

Second Embodiment

FIG. 5 is a schematic diagram showing a method for manufacturing an electrode plate according to another embodiment of the present invention.

The adhesive film attachment—electrode slurry application—heat-drying process is the same as in the first embodiment, and thus the description thereof is omitted here. In the present embodiment, the peeling and retrieving device of adhesive film 21 is different from that in the first embodiment. In the present embodiment, the adhesive film 21 is peeled off by installing the adhesive roller 400 having an outer circumference on which an adhesive tape has been attached, at the current collector sheet 100.

When the current collector sheet 100 is moved from left to right, the adhesive roller 400 peels off the adhesive film 21 on the surface of the sheet 100 while rotating counterclockwise. In the present embodiment, the peeling can be done with a simple device configuration, and a complicated vacuum adsorption device such as a vacuum pump as in the first embodiment is not necessary.

Further, in the first embodiment, since adsorption is performed by a vacuum adsorption device 300, it is possible not to contact the surface of the current collector sheet 100 by adsorption at the upper portion at a little interval from the surface of the current collector sheet 100. Since the adhesive roller 400 is peeled off by contacting the surface of the sheet of the current collector sheet 100, it may influence the surface of the current collector sheet 100. On the other hand, it can be advantageous in terms of peeling force because it is directly contacted and peeled. In the present embodiment, it is possible to efficiently peel off the adhesive film 21 while moving along the entire upper surface of the electrode current collector sheet 100 (or it may be fixed if the electrode current collector sheet 100 is moved).

When contacting along the surface of the current collector sheet (coated part 10) according to the second embodiment, or in the case of the first embodiment, the electrode slurry of the coated part 10 may be lifted on the boundary portion between the non-coated part and the coated part 10 due to the peeling force.

However, the current collector sheet 100 after the heat-drying process is to go through a rolling process in which the surface of the electrode is pressed to be flat, and thus such a lifting is not a big problem. For example, if the surface of the current collector sheet is pressed by a roll press, the boundary portion between the coated part 10 and the non-coated part 20 may also become flat.

Third Embodiment

FIG. 6 is a schematic diagram showing a method for manufacturing an electrode plate according to further another embodiment of the present invention.

In the present embodiment, the number of adhesive films 21 has decreased from 3 to 2 along the width direction of the current collector sheet 100.

Likewise, in the present technology, the pattern of the non-coated part 20 can be adjusted by adjusting the number of the adhesive films 21 and the attached locations of the adhesive films 21. Alternatively, the pattern of the non-coated part 20 and ultimately the pattern on the current collector sheet can be adjusted by adjusting the size and shape, etc. of the adhesive film 21.

Hence, according to the present technology, it is possible to make various patterns for manufacturing electrode cells by changing at least one of the number, location, size and shape of the adhesive films 21. Namely, since it is possible to make a pattern corresponding to the type and shape of the electrode tab, the degree of freedom for the pattern formation increases.

The coating speed can be dramatically raised by a continuous pattern coating by the manufacturing method of the present technology. Further, the automation rate of the manufacturing process can be raised by continuous peeling of the adhesive film 21 described above, and the productivity can be further increased.

Further, the electrode plate for the secondary battery prepared by the manufacturing method of the present technology can improve the battery capacity and energy density.

Referring to FIGS. 3, 5 and 6, an electrode plate, which is manufactured by the manufacturing method of the present technology includes: at least one coated part 10, on which an electrode slurry has been coated, and at least one non-coated part 20, on which the electrode slurry has not been coated. Herein, the non-coated part is positioned along a longitudinal direction of the electrode current collector sheet 100 at regular intervals, a plurality of non-coated parts are formed to be spaced apart from each other along a width direction of the electrode current collector sheet 100, and the coated part 10 is formed on at least portion other than the non-coated part 20. Namely, in a conventional electrode plate for a secondary battery, non-coated parts are formed between coated parts in a band shape, and the electrode slurry is not applied on the band shape portion. However, in the present technology, the electrode slurry may be coated on a portion between non-coated parts 20. This is due to the unique configuration according to attachment and peeling of the adhesive film 21. The non-coated part 20 formed on the left and right side of the coated part 10 of FIG. 6 is removed by the slitting process. Therefore, in the electrode plate, the coated part 20, on which an electrode slurry has been coated, may be formed on the region other than the non-coated part 10.

As such, when the coated portion of the electrode slurry is enlarged, the portion substantially contributing to the battery capacity is increased, so that the battery capacity can be improved. In addition, since more electrode slurry is applied on the current collector sheet 100 of the same area, the energy density can also be improved. In terms of capacity and energy density improvement, the electrode plate of FIG. 6 will be more advantageous than that of FIG. 3 and FIG. 5.

However, it should be noted that it is not that the enlargement of the coated part 20 is unconditionally possible, and the coated part 20 can be enlarged under a constraint that the surface of a sheet (metal), which is necessary for the structure of other battery assemblies, the number, location and shape of the tab portions.

The pattern coating technology of the present technology can be applied to both the positive electrode and the negative electrode. Further, it can be appropriately applied according to the battery type, and particularly, a pattern electrode, which is necessary to manufacture a jelly roll electrode, can be obtained by a consecutive coating process.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

10: coated part
11: electrode slurry coating portion
20: non-coated part
21: adhesive film
21*a*: adhesive
21*b*: filler
21*c*: film sheet
100: electrode current collector sheet
200: drying device
300: vacuum adsorption device
400: adhesive roller

The invention claimed is:

1. A method for manufacturing an electrode plate by performing a pattern-coating to have a coated part, on which an electrode slurry has been coated, and a non-coated part, on which the electrode slurry has not been coated, on an electrode current collector sheet, the method comprising:

attaching at least one adhesive films on at least one portion of the non-coated part on the electrode current collector sheet;

consecutively coating the electrode slurry on the electrode current collector sheet including the adhesive-film-attached parts;

heating and drying the electrode slurry; and peeling the adhesive film from the electrode current collector sheet and retrieving the adhesive film, wherein an adhesive force of the adhesive film is reduced by the heating and drying of the electrode slurry, so that the adhesive film can be removed from the electrode current collector sheet during the peeling and retrieving, and as the adhesive film is removed, a surface of the electrode current collector sheet is exposed.

2. The method of claim 1, wherein the adhesive force of the adhesive film is reduced by heat during the heating and drying of the electrode slurry.

3. The method of claim 1, wherein the adhesive film includes a filler which expands in volume by heat.

4. The method of claim 3, wherein the filler expands in a temperature of 80° C. or higher.

5. The method of claim 4, wherein the filler expands in a temperature between 100 and 200° C.

6. The method of claim 1, wherein the adhesive film is peeled off from the surface of the electrode current collector sheet by adsorbing the adhesive film.

7. The method of claim 6, wherein the adhesive film is peeled off by vacuum-adsorbing the adhesive film by using a vacuum adsorption device.

8. The method of claim 6, wherein the adhesive film is peeled off by adsorbing the adhesive film onto an adhesive roller having an outer circumference on which an adhesive tape has been attached.

9. The method of claim 6, wherein the adhesive film is peeled off by adsorbing the electrode current collector sheet while moving along an upper surface of the electrode current collector sheet.

10. The method of claim 1, wherein a surface of the electrode current collector sheet is pressed to be flat after removing the adhesive film.

11. The method of claim 1, wherein the pattern on the electrode current collector sheet is adjusted by adjusting at least one of a number, a size and a shape of the adhesive film, and a position where the adhesive film is attached.

* * * * *